July 4, 1961
H. RICCI
2,990,860
SAW CHAIN
Filed Dec. 17, 1956
2 Sheets-Sheet 1
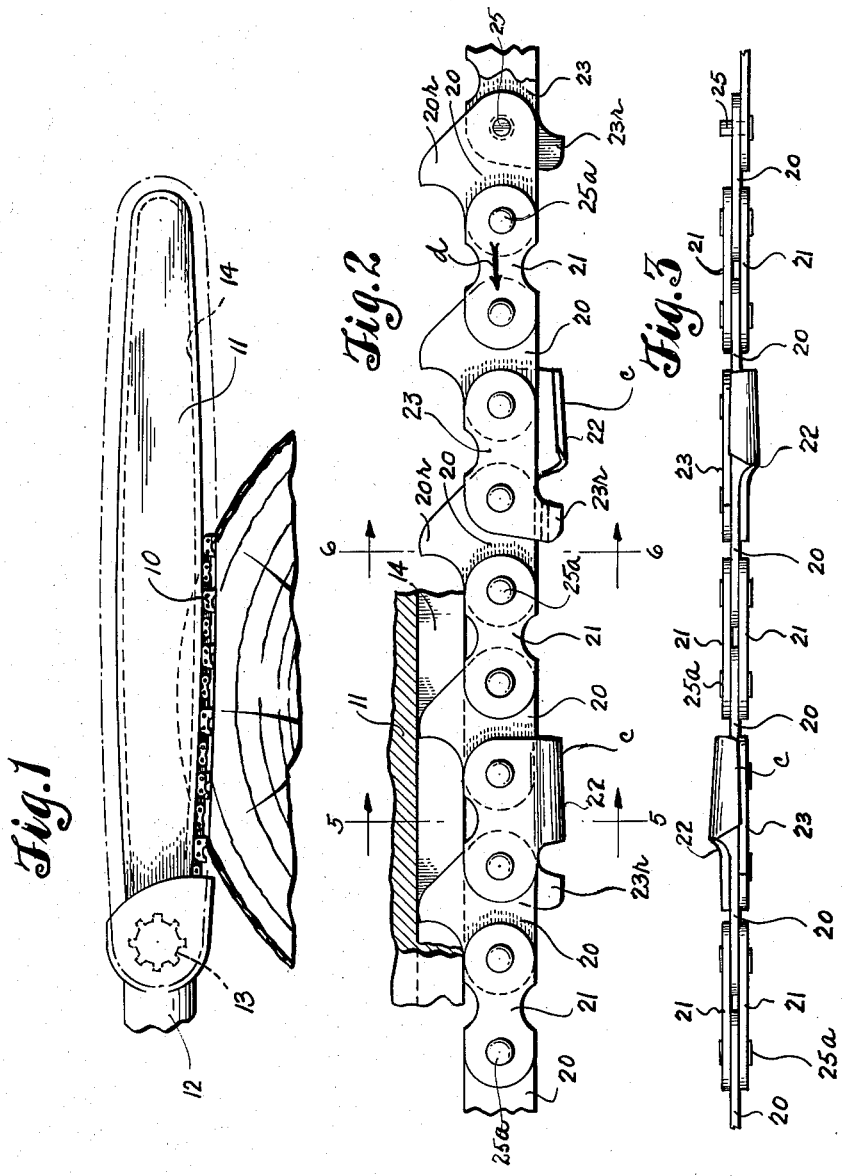
INVENTOR.
HENRY RICCI
BY Robinson & Berry
ATTORNEYS July 4, 1961
H. RICCI
2,990,860
SAW CHAIN
Filed Dec. 17, 1956
2 Sheets-Sheet 2
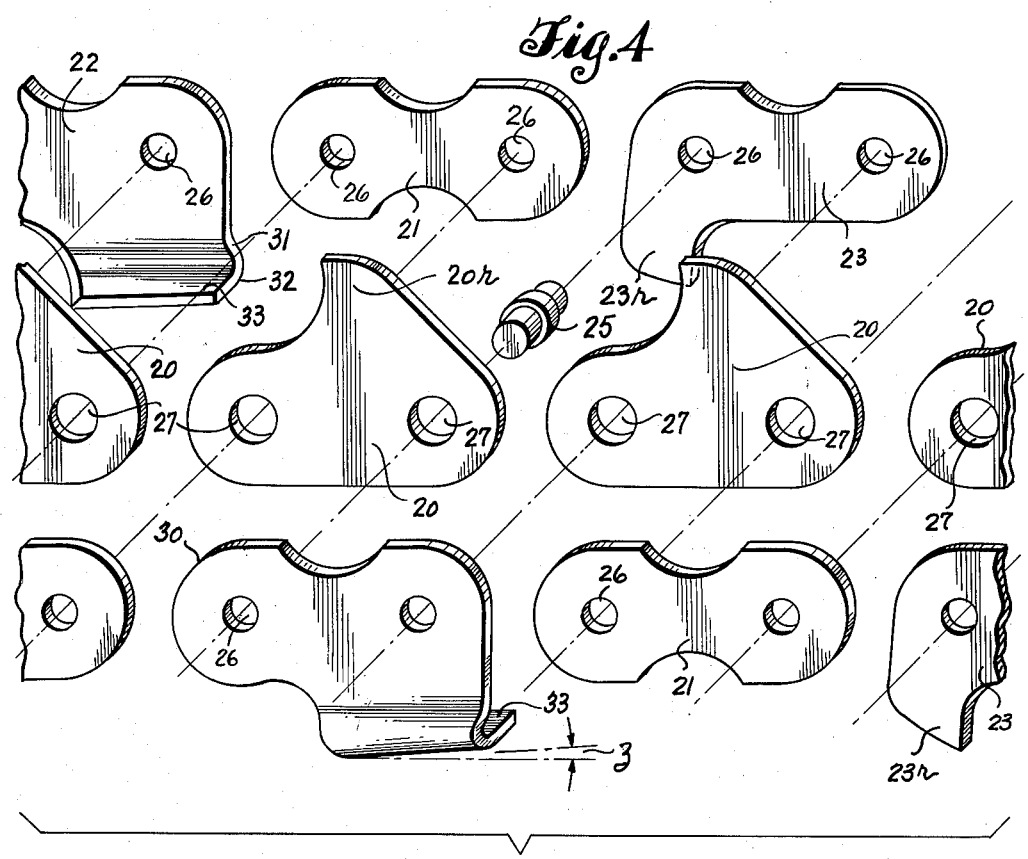
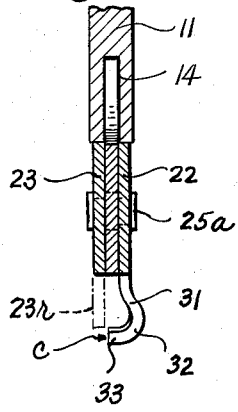
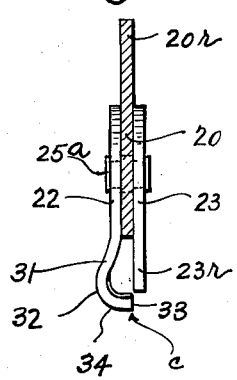
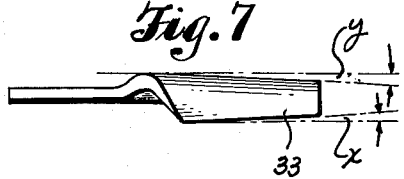
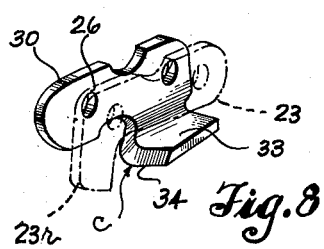
INVENTOR.
HENRY RICCI
BY Robinson & Berry
ATTORNEYS United States Patent Office 2,990,860
Patented July 4, 1961

2,990,860
SAW CHAIN
Henry Ricci, Seattle, Wash., assignor to Outboard Marine Corporation, Waukegan, Ill., a corporation of Delaware
Filed Dec. 17, 1956, Ser. No. 628,794
1 Claim. (Cl. 143—135)

This invention relates to improvements in saw chains of those types made up of a succession of pivotally joined links, embodying right and left hand cutters or routers at regularly spaced intervals therealong, operable, as the chain is driven, to cut the opposite sides and bottom of a kerf; such saw chains now being quite extensively used in logging operations. The present invention pertains more particularly to improvements in saw chains typified by that of United States Patent No. 2,508,784, issued on May 23, 1950.

It is the principal object of this invention to provide a new and improved saw chain construction wherein the chain includes side links that are paired with the router or cutter links and the side links include depth gauges which stabilize the chain by balancing the side pull and also function to gauge the depth of the cut by the routers, thus to produce a smoother, straighter cutting, more efficient and better cutting saw chain.

In accomplishing the above mentioned and other objects of the invention, I have provided the improved details of construction, the preferred forms of which are illustrated in the accompanying drawings, wherein:

FIG. 1 is a view illustrating a portion of a chain saw, and showing it as applied to a log in cutting.

FIG. 2 is a side view of a part of the saw chain, and a portion of the mounting bar along which the chain operates.

FIG. 3 is a view of the cutting edge of the saw chain.

FIG. 4 is an exploded view of a part of the chain showing in perspective, the various forms of links employed in the making of a chain.

FIG. 5 is a vertical section through the chain, taken on line 5—5 in FIG. 2.

FIG. 6 is a vertical section of the chain, taken on line 6—6 in FIG. 2.

FIG. 7 is an edge view of one of the cutter links.

FIG. 8 is a perspective view of paired links as used in the chain, one being shown in dash lines for better showing of the cutter portion of the other link.

Referring more in detail to the drawings:

The present saw chain is designated in its entirety in FIG. 1 by reference numeral 10. It is there shown to be applied to a flat, elongated blade or bar 11 which, at one end, it fixedly secured to a mounting 12 that is associated with an engine, not shown. The chain 10 is driven at the mounting end of the bar 11 about an engine driven sprocket wheel designated by numeral 13. The bar 11 is formed along its longitudinal edges and about its rounded outer end with a continuous, deep cut channel 14 in which the sprocket engaging root portions of the center links are received to guide the chain in its travel, as presently will be more fully explained.

The chain 10 comprises a succession of links pivotally joined at equally spaced centers. It will be observed, more particularly by reference to FIGS. 2 and 3, that a succession of identical center links 20 herein designated as the driving or sprocket engaging links, are arranged in the central longitudinal plane of the chain. The links 20 are spaced and joined end to end along the chain by alternating pairs of side links; one of said alternating pairs comprising identical links 21—21, herein designated as "connector links," and each of the other pairs comprises a cutter or router link 22 at one side of the chain and a depth gauge link 23 at the opposite side. The router links 22 are made in "rights" and "lefts" and they alternate in their arrangement along the opposite sides of the chain. Consequently, the depth gauge links associated therewith likewise alternate in their arrangement along opposite sides of the chain as is best shown in FIG. 3.

As will be understood by reference to FIG. 2, the links of the paired sets, that is, links 21—21 and 22—23, are designed to ride at their inside or lower edges on the edge of the bar 11 along opposite sides of the slot 14 and the chain is guided in its travel and held properly in its functional relationship to the bar by means of the links 20. Each link 20 includes an extended sprocket engaging root portion 20r designed to be received and to travel in the bar slot 14. The root portions 20r also serve as sprocket teeth which coact with the sprocket wheel 13 for the driving of the chain. Operation of the chain in use is in the direction indicated by the arrow d placed thereon in FIG. 2.

The links of the chain are joined end to end by means of pivot pins or rivets 25. Preferably the opposite end portions of the rivets are of reduced diameter and project through holes 26 in the side links of the chain. The medial portions of the rivets are fitted pivotally in holes 27 in the center links. The rivets are secured in the conventional manner by forming heads 25a as illustrated in FIGS. 5 and 6.

It is shown in the various views of the drawings, and particularly in FIG. 4, that each router link 22 comprises a flat plate-like body formed in its opposite end portions with the holes 26 for reception of the rivets. This plate has rounded corners, as at 30, where its inner edge merges into the end edges, to insure easy operation along the bar and especially in passing over the driving sprocket wheel 13. The routing or cutting element of each link 22, designated in its entirety by reference character c, is formed at the outer edge and extends to the rear end of the plate. Each element comprises an outwardly extending portion of the plate which, in reference to its showing in FIGS. 5 and 6, is first curved outwardly, as at 31, then downwardly and inwardly as at 32 in substantially cylindrical curvature. The toe portion 33 of the cutter then extends horizontally through and beyond the central longitudinal plane of the chain. At its forward end the curved cutting element is sharpened to provide a cutting edge along its outer periphery, as at 34 in FIGS. 5 and 6. The outwardly rounded cutting edge of the element extends slightly beyond the plane of the outside face of the plate, as shown in FIGS. 4 and 5, and the cutter has a slight angle of rake along its inside and outside as indicated by the angles at $x$ and $y$ in FIG. 7. Also, there is an angle of rake along its bottom as indicated by the angle $z$ in FIG. 4. Insofar as the cutting element, and its relationship to the plate on which it is formed is concerned, it is substantially like that shown in the U.S. Patent No. 2,508,784 previously referred to.

The important and principal feature of this invention resides in the provision of depth gauges formed on the side links 23 which are paired with the cutter links 22. It is shown in FIG. 2, and also in FIGS. 4 and 6, that the links 23 are substantially like the connector links 21 except that each is formed along the outside edge at its forward end with an extend runner portion 23r, commonly referred to as a "depth gauge." The depth gauge extends downwardly, in reference to its showing in FIGS. 2 and 6, to a lesser extent than the routing element c and limits or controls the depth of the cut in the bottom of the kerf. The depth gauges 23r, operate not only to gauge the depth of the bottom cut made by the cutters but also balance the side pull of the cutters, to prevent what is referred to as cocking or tipping of the links which results in gouging and rough cutting.

It will be appreciated that the new and improved chain construction provides numerous advantages. The chain cuts smoother, easier and faster. There is a substantial elimination of the tendency to gouge, tip or cock which results from router links being out of alignment to the plane of the longitudinal movement of the chain.

What I claim as new is:

A saw chain comprising successive groups of links, each group including a pair of substantially similarly formed elongated, flat, side connector links each having end portions, a sprocket engaging center link with an end portion pivotally mounted between the end portions of the pair of said side connector links, a router link and an opposed depth gauge link each having inner and outer faces and the other end portion of the sprocket engaging link being pivotally mounted between the inner faces of the router link and depth gauge link, the depth gauge link including an elongated, substantially flat, body portion and a depth gauge substantially in the plane of the body portion depending from one end portion thereof, the length of the depth gauge portion being substantially less than the length of the body portion of the depth gauge link, the router link including an elongated body portion substantially of the dimensions of the body portion of the depth gauging link and a shank portion thereof being slightly curved outwardly from the plane of the body portion and with a toe portion integral with the shank portion and turned inwardly substantially at right angle to the body of the router link and having a free edge opposite the shank portion, the shank portion and the toe portion having leading and trailing ends, said toe portion having a cutting edge formed on its leading end, the router link having a reduced end portion opposite the depth gauge on the opposed depth gauge link, the free edge of the toe portion being in substantial vertical alignment with the inner face of the depth gauge link, said depth gauge having its free end closer to the link body than the inturned, free edge of the toe portion of the router link, the router links of successive groups being disposed on opposite sides of the chain and the disposition of the router links, depth gauge links and connecting links being repeated throughout the chain to balance the entire chain in operative condition and thus oppose lateral movement of the router links.

References Cited in the file of this patent

UNITED STATES PATENTS

| | | |
|---|---|---|
| 2,508,784 | Cox | May 23, 1950 |
| 2,558,678 | Garrett | June 26, 1951 |
| 2,652,076 | Bye | Sept. 15, 1953 |
| 2,658,537 | Ackley | Nov. 10, 1953 |
| 2,713,276 | Siverson | July 19, 1955 |